United States Patent Office 2,781,977
Patented Feb. 19, 1957

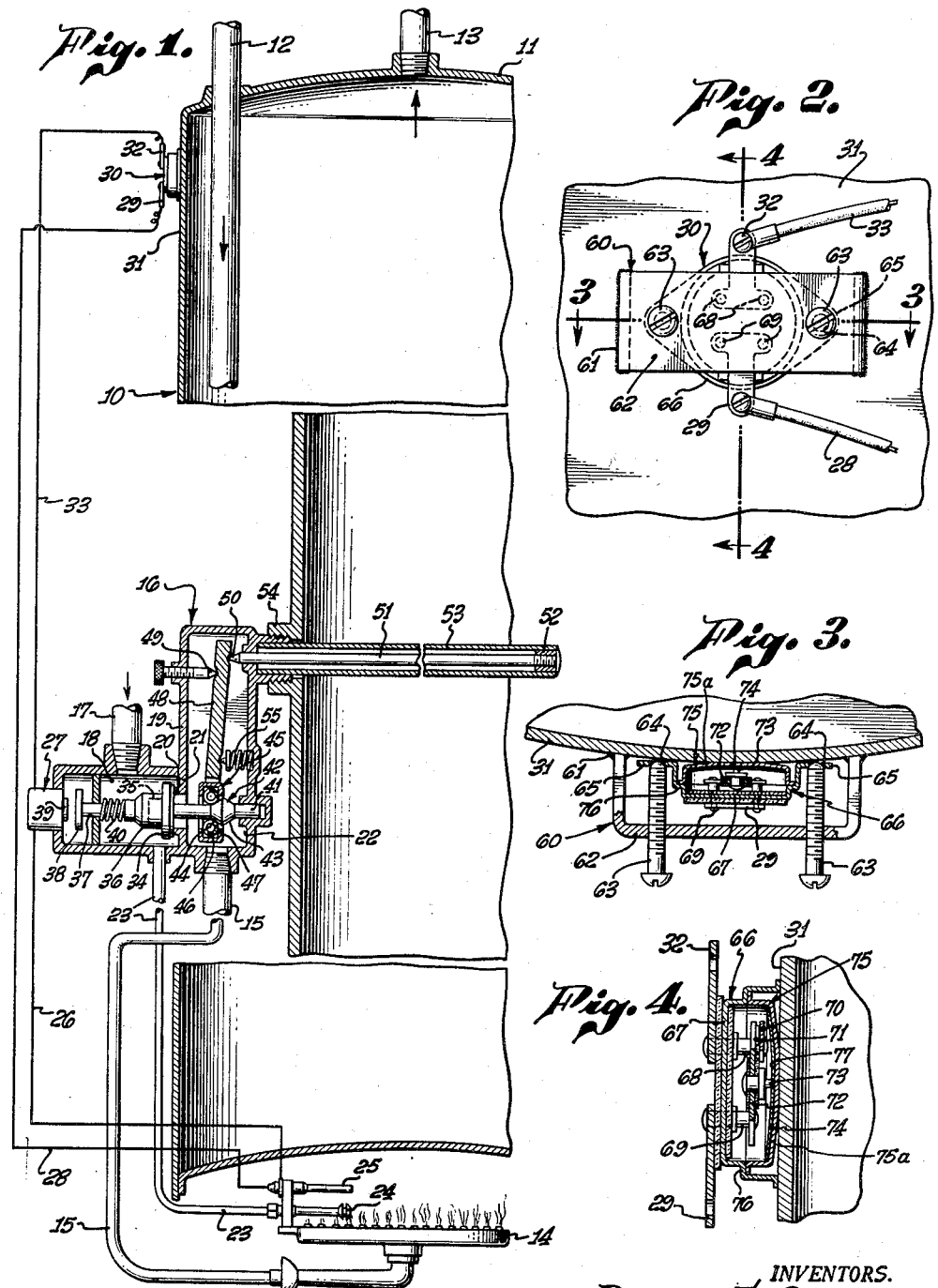
Feb. 19, 1957 — R. F. STANLEY ET AL — 2,781,977
SAFETY GAS CONTROL SYSTEM FOR HOT WATER HEATERS
Filed May 10, 1954
INVENTORS.
ROBERT F. STANLEY,
FRANK M. DAY,
By Bernard Kriegel
ATTORNEY.

2,781,977

SAFETY GAS CONTROL SYSTEM FOR HOT WATER HEATERS

Robert F. Stanley, Glendale, and Frank M. Day, Pasadena, Calif., assignors to Pioneer Water Heater Corp., Los Angles, Calif., a corporation of California Application May 10, 1954, Serial No. 428,636

4 Claims. (Cl. 236—21)

The present invention relates to systems for automatically shutting off the gas supply to the main burner of a hot water heater when the outlet water temperature exceeds a predetermined maximum safe limit.

The supply of gas for hot water heaters is normally controlled by a thermostatically operated valve which automatically opens and closes to maintain the temperature of the water in the tank between preselected maximum and minimum limits. The thermally responsive devices controlling the valve are usually placed in the lower portion of the hot water tank where the water temperature is substantially lower than the temperature of the water at the tank outlet. For that reason, to secure a desired outlet water temperature, the thermostatically controlled valve is set to respond to a substantially lower temperature. As a rule, the water temperature increases progressively from the lowermost part of the tank to substantially the uppermost portion.

In the event of the usual thermostat failing to function properly in controlling the gas valve, the outlet water temperature may reach unsafe limits. To prevent such an occurrence, it has been proposed to place a safety valve control device at the hot water outlet to secure the closing of the main gas valve when the temperature in the outlet exceeds a predetermined maximum value. Normally, the safety control device need not operate to secure a gas valve shutoff, since the valve is being controlled properly by the thermostat that maintains the water in the tank at proper temperatures well below the temperature at which the water would be overheated, which is an unsafe limit. But if this latter condition is reached, then the safety device becomes operative to effect closing of the main gas valve.

A safety control device at the hot water outlet does not always truly reflect the maximum water temperature in the tank. As an example, a hot water tank, when not in use, may have a certain quantity of water vapor or steam under pressure at its uppermost portion, which actually acts as an insulator. Accordingly, the temperature at the hot water outlet might be less than the maximum water temperature in the heater tank, which maximum temperature is usually immediately below the strata or layer of water vapor or steam. Under these circumstances, the water temperature might be allowed to rise to a higher value than the predetermined safe value, with potential harmful results to the equipment and the surrounding area.

Accordingly, it is an object of the present invention to provide an improved control system for preventing overheating of water in a hot water tank, wherein the heat is supplied by a fluid fuel.

Another object of the invention is to provide a safety control system in a hot water heater, in which assurance is had that the maximum temperature of the water in the heater cannot rise above a predetermined safe maximum value, regardless of the presence of water vapor or steam, or a lower water temperature, in the heater outlet.

A further object of the invention is to povide an improved valve control system in the hot water heater, including a pilot flame heated electric generator or thermocouple in series with a coil of an electromagnetic gas valve and a safety switch, which is operative to open the circuit through the coil upon the water temperature reaching a predetermined unsafe limit substantially higher than the normal thermostat setting. The resistance of the electric circuit is kept at a minimum, thereby avoiding the use of several thermocouples, or a thermopile, to generate sufficient current to overcome the resistance, which allows the usual standard thermocouple to suffice.

In its general aspects, the invention contemplates the provision of a main gas burner for heating the water in a tank, the supply of gas being controlled by an electromagnetically operated valve. The ability of the valve to open and close in response to a thermostat immersed in the water is dependent upon the presence of a pilot flame which heats a thermocouple to generate the current for passage through the electromagnetic coil. In the absence of a pilot flame, the valve would be closed and would remain closed despite the cooling of the water in the tank and the tendency of the thermostat to open the valve. A thermally responsive device is attached to the exterior of the tank at the upper portion of the tank, but below the tank outlet. This thermally responsive device operates a switch in series with the electromagnet coil and the thermocouple. The safety switch controlled by the thermally responsive device is normally closed, the thermally responsive device being set to open this switch, and the circuit through the electromagnet, when the water temperature in the tank, at the point where the thermally responsive device is secured, reaches a predetermined maximum value which corresponds to a maximum water temperature in the outlet beyond which the water in the tank would reach unsafe limits, or would be overheated.

Thus, the normal thermostat in the tank will be operative to effect opening and closing of the main gas burner valve to maintain the water temperature at the desired value, provided, of course, that the pilot flame exists for the purpose of heating the hot junction of the thermocouple. However, should the normal thermostat become inoperative and fail to close the valve, then the safety temperature responsive device will become effective when the water temperature in the outlet reaches the predetermined value, to disrupt the circuit through the electromagnet coil and produce closing of the main gas valve. The safety thermally responsive device is placed near but substantially below the hot water outlet, so that it is unaffected by the presence of water vapor and the like in the outlet. Instead, the safety device is responsive to the temperature of the water in the upper portion of the tank, but below its uppermost portion, and will be at a lower temperature than the temperature in the hot water outlet, corresponding, however, to the temperature in the hot water outlet.

This invention possesses many other advantages, and has other objects which may be made more clearly apparent from a consideration of a torm in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a diagrammatic view of the safety control system applied to a hot water heater;

Fig. 2 is a side elevational view, on an enlarged scale, of the thermally responsive safety switch applied to the exterior of the tank adjacent its upper end;

Fig. 3 is a section taken along the line 3—3 on Fig. 2;

Fig. 4 is a section, on an enlarged scale, taken along the line 4—4 on Fig. 2.

A hot water heater is disclosed in the drawings including a water heating and storage tank 10 having its upper end 11 provided with the usual cold water inlet pipe 12 and hot water outlet pipe 13. Below the bottom of the tank is disposed the main burner 14 that has a gas supply pipe 15 running to it from a thermostatically and electromagnetically controlled valve 16 receiving gas through the line 17 from a suitable source. This gas enters the inlet chamber 18 of the valve body 19, passing through the valve seat 20 provided in the body partition 21 into the outlet chamber 22, from where the gas will flow through the gas supply pipe 15 to the main burner 14.

The gas in the inlet chamber 18 can also flow through a pilot burner supply pipe 23 to a pilot burner 24 located in such position that its flame can ignite gas emanating from the main gas burner 14, and also heat the hot junction of a thermocouple 25 of any suitable type. One element of the thermocouple is connected to a lead 26 running to one end of the coil of the valve electromagnet 27, the other element of the thermocouple having a lead 28 running to one of the terminals 29 of a thermally responsive safety switch 30 applied to the exterior 31 of the tank 10 a predetermined distance below its upper end 11. The other terminal 32 of the switch 30 is connected, through a suitable lead 33, to the other end of the electromagnetic coil. It is apparent that the thermocouple 25, safety switch 30 and coil of the electromagnetic valve 27 are in series with one another.

The safety switch 30 is normally closed, and, so long as a pilot flame exists at the pilot burner 24 to heat the hot junction of the thermocouple 25, the latter will generate sufficient current to energize the coil of the electromagnet and enable the electromagnetic valve 16 to operate in response to the temperature of the water in the tank 10. However, should the pilot flame cease to exist, or should the safety switch open, then the series circuit through the electromagnetic coil will be interrupted and the valve 16 will close.

The electromagnet thermostatically operated valve may be of any suitable type, the one shown in the drawings being represented somewhat diagrammatically merely to disclose an operative system. Specific details of the valve may be found in Patent 2,383,401. The valve may have a disc or head 34 movable into and out of engagement with the companion seat 20. The valve head has a stem 35 extending rearwardly therefrom and slidably piloted within a generally cup-shaped member 36 secured to a stem 37 suitably attached to an armature 38 adapted to engage the electromagnet 39. A spring 40 normally urges the parts 36, 37, 38 in a direction away from the magnet 39, to cause the member 36 to engage the valve head 34 and shift and hold it against its seat 20, for the purpose of closing the valve 16. However, when the armature 38 has been placed in engagement with the electromagnet 39, and current is flowing through the latter, the electromagnetic force is sufficient to overcome the compressive force of the spring 40 and prevent it from shifting the valve head 34 to closed position.

The valve head 34 has a valve stem 41 extending forwardly from it and slidably supported in the valve body 19 for axial movement. This stem has a double conical portion 42 providing oppositely tapering surfaces 43, 44. This conical portion or element 42 is encompassed by a spring cage 45 having an encompassing coil spring 46 extending circumferentially therewithin and normally tending to contract inwardly into engagement with the smaller diameter portion of the valve stem 41. This spring 46 is prevented from moving axially of the cage by the depending side flanges 47 of the latter.

The cage 45 is suitably pivoted to one end of a lever 48 bearing upon a fulcrum point 49, the other end of the lever on the opposite side of a fulcrum point 49 engaging a conical point 50 of a rod 51 secured at its inner end to a plug 52 sealingly engaging a tube 53 attached to the valve body 19, the latter being threaded into a boss 54 in the side wall of the hot water tank 10, so as to locate the tube 53 and rod 51 in the water at a particular position. It is usual practice to dispose the temperature responsive tube 53 and rod 51 in the lower one-fifth of the hot water tank 10.

Assuming the safety switch 30 to be closed and the pilot flame in existence, current will pass through the electromagnet 39. If the armature 38 has been placed in contact with the electromagnet 39 by operation of a suitable reset mechanism (not shown), the spring 40 will be incapable of holding the valve head 34 in closed position. Accordingly, should the temperature of the water at the location of the tube 53 fall below a predetermined minimum amount, the tube 53 will contract, and, since the rod 51 is made of a material that does not expand or contract to the same extent as the tube, the contraction of the latter will cause the rod 51 to bear against the outer end of the lever 48, swinging such lever on its fulcrum 49 against the force of a spring 55 and moving the opposite end of the lever, as well as the spring cage 45, in the opposite direction, forcing the coil spring 46 up one conical surface 44, whereupon it will snap over onto the other conical surface 43 and shift the valve stem 41 in the opposite direction to the movement of the spring cage 45, removing the valve head 34 from its seat 20, thus opening the valve 16 and allowing gas to pass to the main gas burner 14. As the products of combustion heat the water in the tank 10, the temperature will rise, causing the tube 53 to expand. Such action will shift the rod 51 in a direction out of the body 19, allowing the spring 55, to swing the lever 48 in the opposite direction, to snap the coil spring 46 onto the other side 44 of the conical element 42 on the valve stem 41, which will shift the valve stem in a direction to move the valve head 34 into engagement with its seat 20, thereby shutting off the supply of gas to the main burner 14 and discontinuing the heating of the water.

The thermostatically responsive valve 16 will continue to open and close, depending upon the variations in the temperature of the water. This water temperature in the lower portion of the tank 10, where the thermally responsive element 53 is normally located, is substantially lower than the temperature of the water in the outlet 13 from the tank, because of the fact that the water in the tank is at progressively higher temperatures running in a direction from its lower end to its upper end. So long as the thermostatically responsive device functions properly, there is no danger of overheating the water in the tank through its rising to an unsafe temperature. However, should there be some malfunctioning in the thermally responsive valve, the water temperature might reach a higher degree than is safe, whereupon it is desired to secure an automatic closing of the main burner valve 16. Such automatic closing is effected in the present instance by the thermally responsive safety switch 30 applied to the exterior of the tank 10.

As disclosed most clearly in Figs. 2, 3 and 4, a generally U-shaped bracket 60 is secured in any suitable manner, as through use of welding material 61, to the exterior of the tank at the point where the thermally responsive switch 30 is located. The base 62 of this bracket has a pair of spaced screws 63 threaded through it, the inner ends of these screws being received within holes 64 in the outwardly extending ear portions 65 of an outer case 66 of the safety switch. The base 67 of this case has a pair of electrically conductive posts 68, 69 suitably supported thereon and insulated from the base in any suitable manner, each of the posts extending from a point within the case 66 to a location externally of the case, where they are each connected to a respective terminal 32, 29, the leads 33, 28 being secured to these terminals.

The inner portion of one of the posts 68 is connected to a stationary or fixed contact 70 adapted to be engaged by a movable contact 71 of a conductive arm 72 suitably pivotally supported and electrically connected to the other post 69. This arm 72 carries a central pin 73 insulated from the arm and projecting inwardly (toward the tank) therefrom, this pin engaging a disc 74 suitably secured at its periphery to a generally cup-shaped cover 75 and disposed adjacent the base portion 75a of the cover. The margins of the cover bear against a circumferential shoulder 76 of the case, to which the cover is suitably secured, as by spot welding at several points around its marginal portion. The central portion 77 of the cover makes a substantial surface contact with the metallic exterior 31 of the hot water tank 10, this central portion also being engageable with the disc 74 which contacts the switch arm pin or projection 73.

When the temperature of the water in the tank at the location of application of the safety switch 30 is below a predetermined value, the disc 74 will remain in a relative outward position with respect to the switch case 66, allowing the switch arm 72 to occupy a position in which its movable contact 71 engages the stationary contact 70, the switch 30 being in a closed position. However, upon the temperature of the water in the tank at the location of the switch 30 reaching a predetermined maximum value, the disc 74 will deflect in a direction away from the tank 10, bearing against the switch arm projection 73 and moving it and the arm 72 outwardly of the tank to separate the movable contact 71 from the fixed contact 70, thereby opening the switch 30, which will open the circuit to the electromagnetic coil 39. The disc 74 has such thermal characteristics that upon reaching a predetermined temperature it will deflect or "can" in an outward direction, to produce a rapid opening of the switch. Conversely, upon cooling of the water in the tank, the disc 74 will snap back to its original position, allowing the safety switch 30 to close. However, despite such closing, the electromagnetic valve 16 will not be reopened, but will remain closed until it has been reset manually, in a known manner, as disclosed and described in the above-identified Patent 2,373,401.

The safety switch 30 is not placed at the outlet 13 of the water heater, but at a substantial distance below this outlet and above the location of the tube 53, so as to be responsive to a much higher water temperature than the normal thermally responsive device that opens and closes the electromagnetic valve 16. The switch 30 is placed against the exterior 31 of the tank 10 substantially below the outlet end 13, but within the upper one-quarter of the tank measured from its upper end 11. The temperature of the water in the tank at the location of the switch 30 will be substantially lower than the temperature of the water in the hot water outlet 13. However, the temperature at which the switch will open corresponds to a maximum temperature in the outlet 13 above which the water must not be heated, in the interest of safety. As an example, if the temperature of the water in the outlet 13 is not to exceed 210 degrees F., then the safety switch 30 may be located at a substantial distance below the outlet 13 where the water temperature will be 185 degrees F. during the time that the temperature in the hot water outlet is 210 degrees F. The location of the switch 30 at a predetermined point below the outlet 13 insures that the switch will be responsive to a liquid water temperature, and not to the temperature of vapor or steam in the upper terminal portion of the tank 10.

In view of the lengths of wire that comprise the electric circuit, the usual small wires that are employed between a thermocouple and an electromagnet coil would offer too much resistance to the flow of current, and might prevent sufficient passage of current through the coil to hold the armatture 38 in engagement with the magnet 39 and against the force of the armature spring 40. To overcome this disadvantage in the past, several thermocouples or a thermopile have been availed of to generate sufficient current from the pilot flame and insure the presence of ample current to properly control the electromagnetic valve. In the present instance, and despite the relatively long lengths of wire that are necessary in the series circuit, no special thermocouples or thermopile are needed. The usual standard thermocouple 25 will suffice, in view of the fact that the wires 26, 28 in the greater portion of the length of the circuit are of comparatively large size, to reduce their resistance to substantially zero. A single thermocouple 25 is sufficient to generate ample current for the proper operation of the electromagnet 39. Accordingly, the use of the large size wires provides an economical system through avoiding the use of special thermocouple devices.

The inventors claim:

1. In combination: a water heater including a main burner, a pilot burner for igniting said main burner, and a storage tank having a cold water inlet and a hot water outlet; means for feeding fuel to said main burner including a control valve; thermally responsive means for opening and closing said valve in accordance with predetermined minimum and maximum temperatures of water at a first predetermined location in said tank; a thermal electric generator heated by the pilot burner flame; an electromagnet energized by said generator when said pilot flame exists to enable said valve to be opened and closed by said thermally responsive means and to hold said valve closed in the absence of said pilot flame; and switch means disposed completely externally of said tank and in thermal contact with the external surface of said tank and responsive to the temperature of water in said tank at a second predetermined location where water vapor in the tank will not accumulate, said second location being substantially below said outlet and substantially above said first location to open the circuit to said electromagnet when the water temperature in said tank at said second location reaches a predetermined maximum value substantially above the maximum water temperature at said first location.

2. In combination: a water heater including a main burner, a pilot burner for igniting said main burner, and a storage tank having a cold water inlet and a hot water outlet; means for feeding fuel to said main burner including a control valve; thermally responsive means for opening and closing said valve in accordance with predetermined minimum and maximum temperatures of water at a first predetermined location in said tank; a thermal electric generator heated by the pilot burner flame; an electromagnet energized by said generator when said pilot flame exists to enable said valve to be opened and closed by said thermally responsive means and to hold said valve closed in the absence of said pilot flame; and switch means in series with said generator and electromagnet, said switch means being disposed completely externally of said tank and in thermal contact with the exterior of said tank at a second predetermined location where water vapor in the tank will not accumulate, said second location being substantially below said outlet and substantially above said first location to open the circuit to said electromagnet when the water temperature in said tank at said second location reaches a predetermined maximum value substantially above the maximum water temperature at said first location.

3. In apparatus as defined in claim 1; wherein said first location lies within the lower one-fifth of said storage tank, said second location lying within the upper one-quarter of said tank.

4. In apparatus as defined in claim 2; wherein said first location lies within the lower one-fifth of said storage tank, and said second location lies within the upper one-quarter of said storage tank.

(References on following page)

References Cited in the file of this patent

UNITED STATES PATENTS

| | | | |
|---|---|---|---|
| 1,854,207 | Luthe | Apr. 19, | 1932 |
| 2,013,713 | Hamilton | Sept. 10, | 1935 |
| 2,312,479 | Ray | Mar. 2, | 1943 |
| 2,361,944 | Jackson | Nov. 7, | 1944 |
| 2,383,401 | Mantz | Aug. 21, | 1945 |
| 2,576,675 | Drow | Nov. 27, | 1951 |
| 2,717,381 | Matthews | Sept. 6, | 1955 |